Sept. 30, 1958 P. DAGUIER 2,854,641

FILTERING NETWORK

Filed March 15, 1955 3 Sheets-Sheet 1

INVENTOR
Pierre Daguier
By Ralph B. Stewart
Attorney

Sept. 30, 1958 P. DAGUIER 2,854,641

FILTERING NETWORK

Filed March 15, 1955 3 Sheets-Sheet 2

INVENTOR
Pierre Daguier
By Ralph B. Stewart
attorney

Sept. 30, 1958 P. DAGUIER 2,854,641

FILTERING NETWORK

Filed March 15, 1955 3 Sheets-Sheet 3

INVENTOR
Pierre Daguier
By Ralph B. Stewart
attorney

United States Patent Office 2,854,641

Patented Sept. 30, 1958

2,854,641

FILTERING NETWORK

Pierre Daguier, La Courneuve, France, assignor to Societe Nouvelle de l'Outillage R. B. V. et de La Radio-Industrie, Paris, France Application March 15, 1955, Serial No. 494,341

Claims priority, application France March 19, 1954

11 Claims. (Cl. 333—70)

Figure 1:
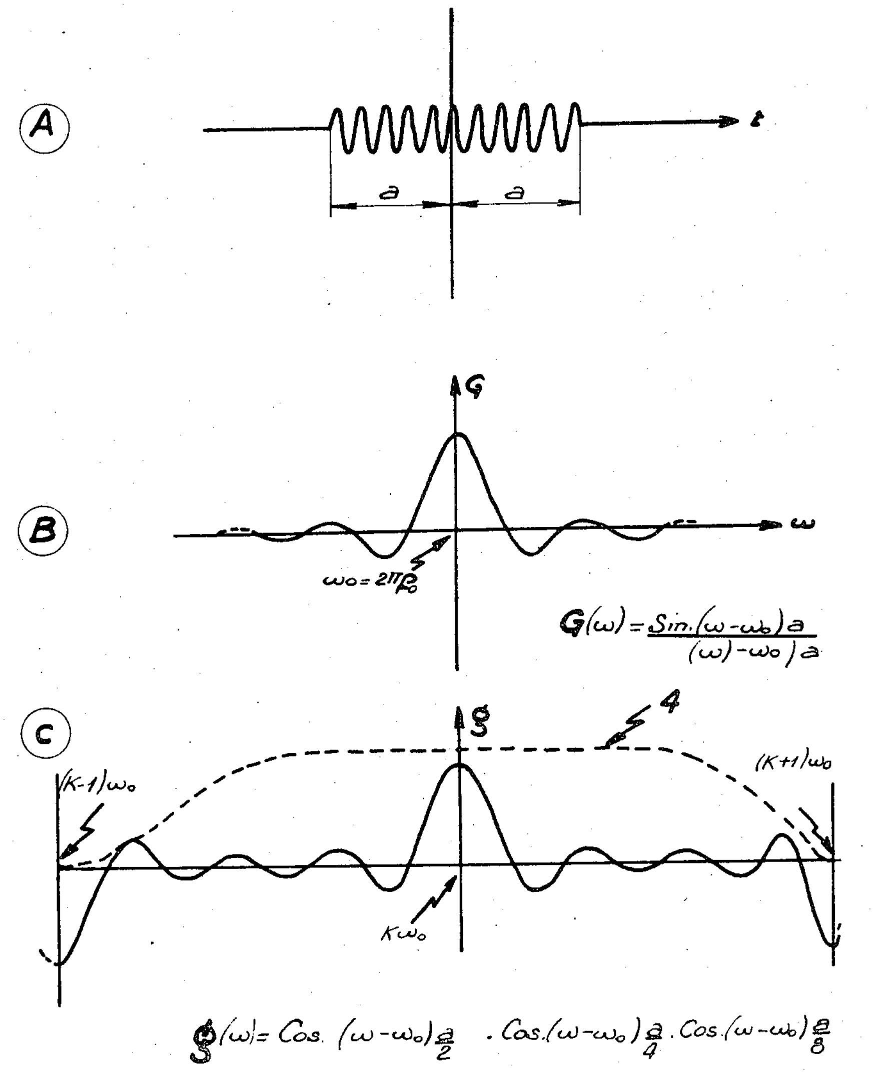

The invention relates to the realization of filtering networks of transfer characteristic of the type G($w$) such that $$G(w)=\frac{A \sin a(w-w_0)}{r(w-w_0)} \qquad (1)$$

where A and $a$ are parameters independent of the frequency $f_0$ of the incoming signal $$\left[f_0=\frac{w_0}{2\pi}\right]$$

assuming that $f_0$ may take any value including zero. The use of such filtering networks is very wide. Indeed, they can be used each time that it is necessary to develop a transfer characteristic of the type G($w$) since they may operate in a very wide band of frequencies from video frequencies ($f_0=0$) up to ultra-high frequencies and hyper-frequencies as will appear later on. This wave shaping may be required either at the transmitting end or at the receiving end of a transmission channel. Considering the use of such circuits at the receiving end, some results of the information theory should be recalled to point out the advantages which are provided by the use of circuits according to the invention in detecting incoming pulses which are mixed up with noise signals. Indeed, it is well known that the best conditions to detect such signals when the noise is supposed to show a random distribution in all the frequency spectrum, is to use a receiver the gain or transfer characteristic of which is conjugated with the information through a Fourier transformation. Function G($w$) may be shown to be the Fourier transformation of a sinusoidal oscillation at frequency $f_0$ which is modulated by a rectangular pulse of duration 2$a$. Since this function is real, it is its own conjugate. This shows that the filers according to the invention are the best circuits to detect recurrent pulses which are received together with a randomly distributed noise signal. Such a problem has a very large technical application since it corresponds to the problem of reception in most of the pulse type telecommunications at fixed carrier frequency, and also to all the pulse detecting systems such as radar.

The description which follows is mainly directed to the use and embodiment of the filter according to the invention when applied to the reception of pulses. However, this choice of one particular type of utilisation of the filters according to the invention should not be considered as a limitation of its scope of application. Indeed, the filter according to the invention is also very useful when used to operate on video signals, that is rectangular pulses which do not modulate any carrier wave. Such filters may be used indeed as aperture correcting means in pulse transmitters or receivers.

It is therefore an object of the invention to provide a filtering network the transfer characteristic of which is of the type $$G(w)=\frac{A \sin a(w-w_0)}{a(w-w_0)}$$

It is an other object of the invention to provide means whereby a filtering network of transfer characteristic $$G(w)=\frac{A \sin a(w-w_0)}{a(w-w_0)}$$

may be obtained by combination of lumped or distributed impedances.

It is another object of the invention to provide means for the realization of a circuit, the transfer function is of the type $$G(w)=\frac{A \sin a(w-w_0)}{a(w-w_0)}$$

comprising a limited number of circuit elements.

It is another object of the invention to provide means of realization of a filter of transfer characteristic $$G(w)=\frac{A \sin a(w-w_0)}{a(w-w_0)}$$

in which $$f_0=\frac{w_0}{2\pi}$$

may take any particular value including zero.

According to the invention, the filter of transfer characteristic $$G(w)=\frac{A \sin a(w-w_0)}{a(w-w_0)}$$

comprises a limited number of elementary cells associated with a pass-band filter, each cell comprising a delay line and a direct connection in parallel, the delays introduced by the different cells being chosen so as to constitute a geometric series of decrement ½. The largest delay introduced by any one of the cells constituting the filter is equal to a parameter $a$ and should be equal to a multiple of half the period of the carrier wave of frequency $f_0$ provided such a carrier wave exists.

According to an embodiment of the invention, an amplifier stage is provided between successive cells.

According to another embodiment of the invention, the coupling element between cells comprises an additive stage which provides the direct connection and which is connected in parallel with the delay line.

In another embodiment of the invention, amplification may be provided at the output of each cell or of some of the cells or at the end of the filtering network.

According to another feature of the invention, the band-pass filter associated to the cells may be constituted by several elementary band-pass filters connected separately to individual cells and showing different characteristics versus frequency. It may also be included in the source of input signals when such a source comprises a pulse receiver the pass-band characteristic of which is of course limited.

As is well known from the thory, the transfer characteristic of the filtering network is the product of the transfer characteristic of each of its constitutive cells. Such a product is of the algebraic type and therefore, it is possible to change the order of succession of the different cells which constitute the filter from the normal sequential order of terms of the series of decrement ½. This is also the reason why it is possible to constitute the pass-band filter associated with the elementary cells as several elementary filters where such a possibility is preferred from the technical point of view.

To fully understand the operation of the filter according to the invention, it is necessary to recall some well known mathematical results. Curves A and B of Figure 1 show, respectively, a rectangular impulse as a voltage amplitude versus time and the Fourier transformation of such a signal as amplitude versus frequency $f$ or pulsation $w$ (with $w=2\pi f$). The mathematical expression of impulse $A(t)$ may be written as $$A(t)=[U(t+a)-U(t-a)e^{jw_0t}]\equiv A(t) \quad (2)$$

where $U(t)$ is Heaviside's impulse function, $2a$ is the pulse duration and $w_0$ the pulsation of the carrier wave of frequency $f_0$. The Fourier transformation of function $A(t)$ is given by $G(w)$ with $$G(w)=K\frac{\sin (w-w_0)a}{(w-w_0)a} \quad (3)$$

Function $G(w)$ may also be written as follows:

$$G(w)=K'[\cos (w-w_0)a/2][\cos (w-w_0)a/4] \\ [\cos (w-w_0)a/2^n]\cdot\left[\frac{\sin (w-w_0)a/2^n}{(w-w_0)a/2^n}\right] \quad (4)$$

When $n$ becomes infinite the product of Equation 4 is convergent and therefore, it is possible to write $$G(w)\equiv K' \cos (w-w_0)a/2 \cos (w-w_0)a/4 \\ \cos (w-w_0)a/16 \ldots \cos (w-w_0)a/2^n \quad (5) \\ n\to\infty$$

If equation 5 is limited to a finite number of terms, the limited produce $g_n(w)$ is no longer identical to $G(w)$. However, in a limited range of variations of the variable $(w-w_0)$ around $w_0$, $g_n(w)$ is all the more near to $G(w)$ that the number of terms of the product of cosinus is greater. Accordingly, if $n$ terms are considered, $n$ being finite, the limited product $$g_n(w)=D \cos (w-w_0)a/2 \\ \cos (w-w_0)a/4 \ldots \cos (w-w_0)a/2^n \quad (6)$$

may be taken instead of $G(w)$ in a frequency band around $$f_0=\frac{w_0}{2\pi}$$

The right end part of Equation 6 is a periodic function of $w$, the period being $$T=\frac{a}{K2^n}$$

This function is an even function of $(w-w_0)$. Curve C of Figure 1 is representative of function $g_3(w)$ such as $$g_3(w)=2 \cos (w-w_0)a/2.\cos \\ (w-w_0)a/4.\cos (w-w_0)a/8 \quad (7)$$

Around $w=w_0$, curve C is very near curve B. The periodicity of curve C is $$F=\frac{8}{a}$$

and the frequency interval between a maximum and the adjacent minimum is $$df=\frac{4}{a}$$

Figures 2, 3, 4A:
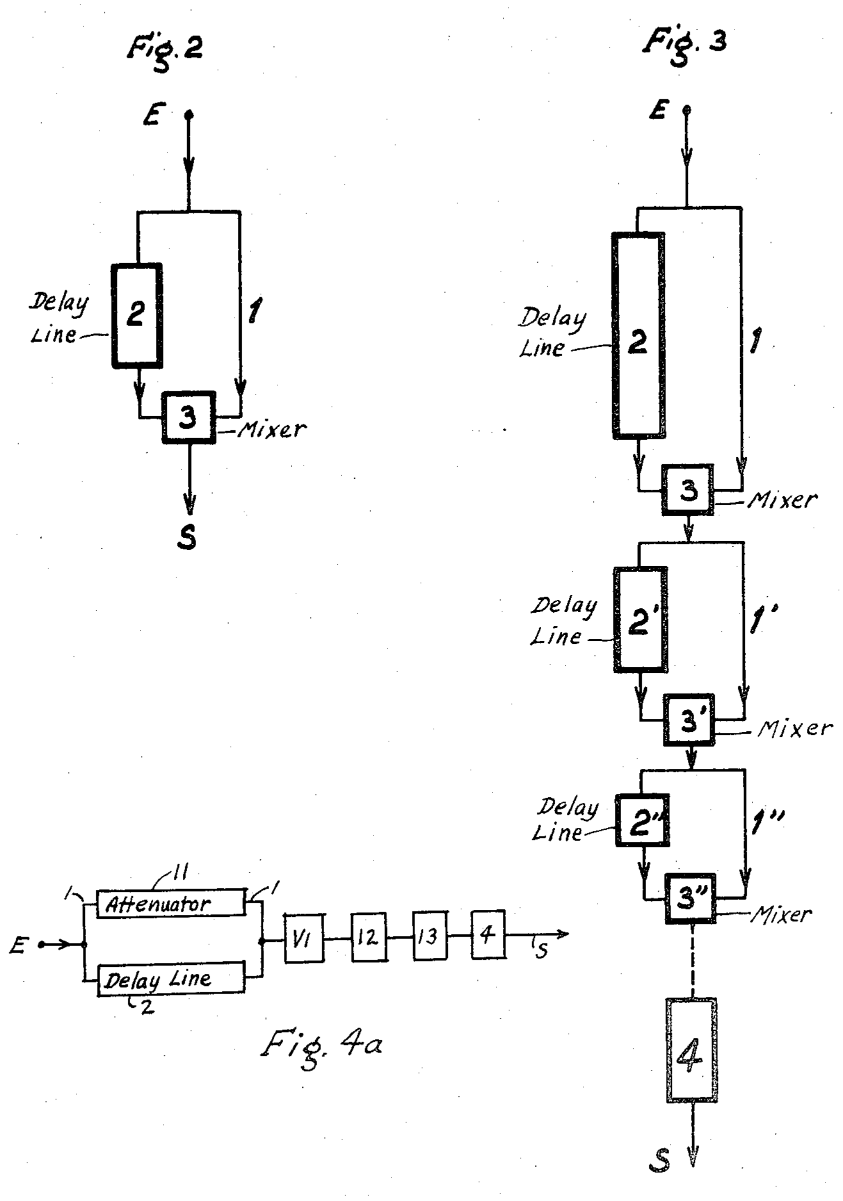

Figure 2 is a schematic diagram of an elementary cell constituting the filter according to the invention. E shows the input of the cell. Lead 1 shows the direct coupling between input E and the additive circuit 3 which feeds output S. 2 is the elementary delay line. The filtering network is supposed to comprise $n$ such elementary cells. The delays introduced by successive elementary delay lines such as 2, constitute a geometrical decreasing series of decrement ½ the longest delay being equal to $a$. The output signal developed at the end feeds a band-pass filter tuned at frequency $f_0$ or a harmonic of $f_0$. As will be understood, this filter may be constituted by another elementary cell of the type shown on Figure 2, the elementary delay line 2 of which introduces a delay $$\frac{a}{2^{p-1}}$$

where $p-1<n$ if $$\frac{a}{2^n}$$

is the shortest delay of any cell of the network.

Figure 3 shows a filter incorporating three elementary cells. The output band-pass filter is shown at 4.

It is easy to show that the transfer characteristics of the circuit made of a set of elementary cells such as shown on Figure 2 is of the form $g(w)$ which has been referred to above. Let $A(t)$ be the input signal applied at E of the elementary cell of Figure 2. The output signal from delay line 2 may be written as $$A_1=A(t)e^{jwa/2^{n-1}} \quad (8)$$

The output signal from the elementary cell is given by $$S_2=A(t)(1+e^{jwa/2^{n-1}}) \quad (9)$$

$$=A(t)(1+\cos a/2^{n-1}+j \sin a/2^{n-1}) \quad (10)$$

The transfer characteristic of the elementary cell is thereby given by $$g_{n-1}(w)=\frac{S_1}{A(t)} \quad (11)$$

$$g_{n-1}(w)=(2 \cos wa/2^n)e^{j\varphi} \quad (12)$$

$$tg\varphi=\frac{\sin wa/2^{n-1}}{1+\cos wa/2^{n-1}}=tgwa/2^n \quad (13)$$

The transfer characteristic of a set of three elementary stages such as shown on Figure 3 is given by $$g_3(w)=(2 \cos wa/2).(2 \cos wa/4). \\ (2 \cos wa/8)e^{j(wa/2+wa/4+wa/8)} \quad (14)$$

since the successive delays introduced by the elementary delay lines constitute a geometrical series of decrement ½. When the input signal $A(t)$ is a rectangular pulse such as shown by curve A of Figure 1 and if the carrier wave frequency $f_0$ is such that $$f_0=\frac{2^nK}{a}$$

where K is any integer, the carrier wave amplitude of the output signal from each elementary cell will be in phase at the maximums and minimums of the representative curve as explained above (see curve B and C of Figure 1 in the vicinity of $w=w_0$ or $w=nw_0$).

The condition $$f_0=\frac{K2^n}{a}$$

corresponds to values of $w_0$ such that the terms in cosinus of the equation $$G(w)=\frac{\sin (w-w_0)a}{(w-w_0)a} \text{ for } w=w_0$$

are simultaneously equal to +1 or −1. Therefore, at frequency $f_0$ of the carrier wave, each one of the terms of the product must be either minimum or maximum. This condition may be written by reference to Equation 14:

$$\frac{w_0a}{2}=\frac{w_0a}{4}+2k\pi=\frac{w_0a}{8}2k'\pi$$

$$f_0=\frac{8k}{a}$$

In other words, the carrier frequency should be a multiple of the reciprocal of the longest delay ($a$) introduced by one of the elementary cells of the filter network. It is easy to fulfill this condition, supposing a known, by heterodyning the input signal with a local oscillator of correct frequency. When the filter is such as shown on Figure 3, that is when the filter comprises three elementary cells, the transfer characteristic of the circuit is Equation 14. The filter is connected to a band pass filter 4 which transmits only the output signal frequencies which surround frequency $f_0$ or another maximum or minimum of curve C of Figure 1. The dashed line on curve C shown by reference 4 corresponds to the band-pass characteristic of output filter 4 of Figure 3.

It may be seen that each time, another elementary cell is added to the filter, another cosinus term is added to the transfer characteristic equation. In other words, the frequency interval $df$ between two successive maximums of the representative curve of the transfer function $g(w)$ is multiplied by 2. This remark will help in designing filter 4. It is also easy to show that the output energy transmitted through pass-band filter 4 is increased approximatively by the same factor 2. Therefore, it is possible to decide how many cells will be used to obtain a given energy at the output of the filter.

Figure 4:
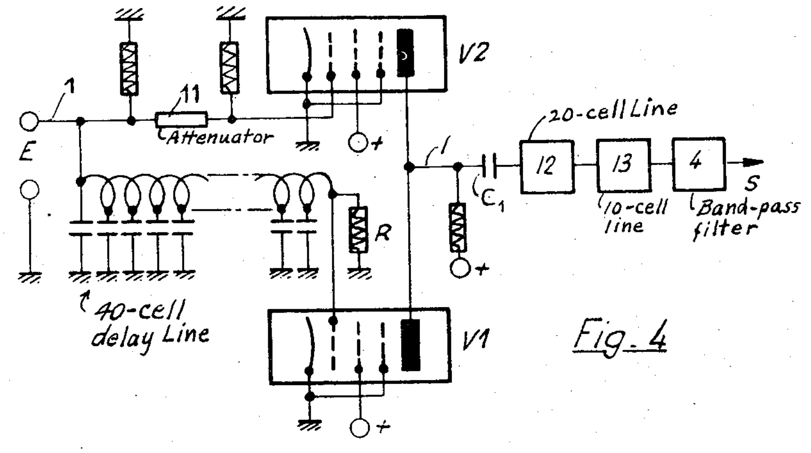
Figure 5:
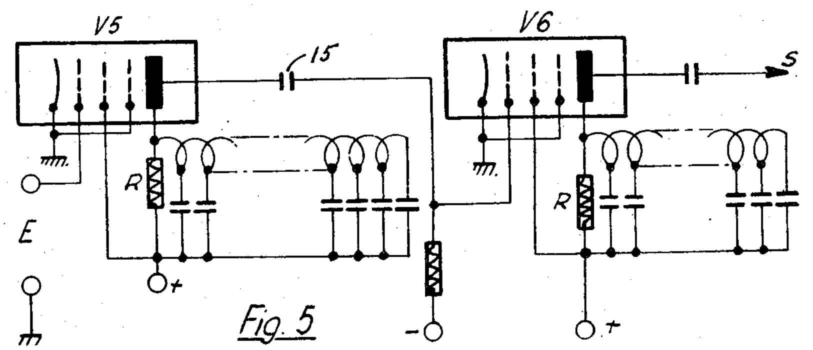
Figure 6:
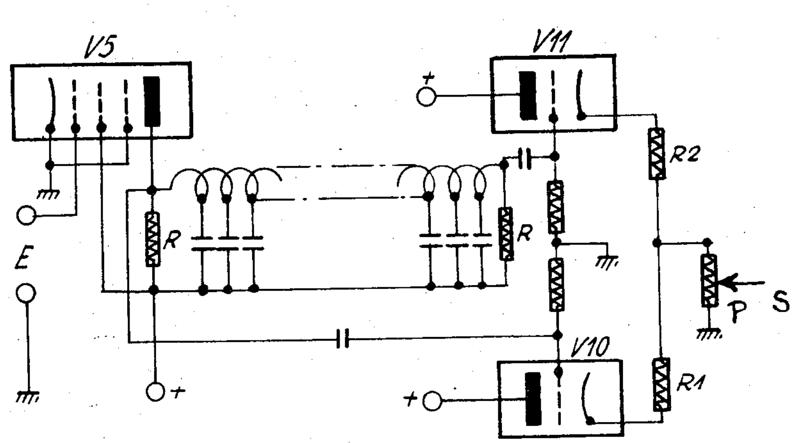

Figures 4, 5 and 6 show detailed wiring diagrams of embodiments of the invention designed for reception of pulses, the duration of which ($2a$) is equal to 1 $\mu$s. at a carrier frequency $f_0$ of 16 mcs. These numerical values have been chosen because they correspond to actual realizations but do not constitute any limitation to the scope of application of the filters according to the invention. Of course, owing to the fact that the total delay of the elementary cells is at most equal to the pulse duration, the input signal which may be applied to the circuits according to the invention should have a recurrent periodicity smaller than the pulse duration.

The reference numbers on Figure 4 are the same as the one used on Figures 2 and 3. The delay line introduces a delay $a=0.5$ $\mu$s.

In a particular embodiment of the invention the line is made of an artificial line comprising 40 identical cells each made of a coil of inductance $L=4.9$ $\mu$H. and a condenser of capacity $C=25$ $p$F. The mutual inductance between two adjacent coils is approximatively 0.09 $\mu$H. The total inductance of the line is 250 $\mu$H.; the characteristic impedance is equal in value to the resistance of terminal resistors R that approximates 530 ohms. The complete delay line of forty cells is placed on an insulating plate of 30 centimeter length. As shown, the delayed signal delivered by the line is applied to the control grid of tube $V_1$. The input signal is transmitted, through attenuator 11 which provides the same attenuation as the delay line so that the peak levels of both signals should be equal, to the control grid of a second tube $V_2$. Addition of these two signals is obtained by connecting the plates of tubes $V_1$ and $V_2$ in parallel. The output signal is applied by means of coupling condenser $C_1$ of high capacity to the following stage of the filter shown at 12. This stage is designed in the same way as the stage which has just been described with the difference that the delay line comprises only 20 identical cells. In the same way, stage 13 of the filter includes a delay line comprising 10 identical cells which introduce a delay equal to ⅛ $\mu$s. The output from stage 13 is fed to pass-band filter 4. The latter may be reduced to a circuit tuned at frequency $f_0$, the transmission characteristic of which is as shown on curve C of Figure 1 at 4.

In another embodiment of the invention, a modification of Figure 4 shown in the block diagram of Figure 4*a*, the output from attenuator 11 of each stage is applied directly to the input of the delay line of the following stage which modification omits tube $V_2$, the addition being provided directly by connecting in parallel the direct lead 1 and the delay line terminal.

Figure 5 shows another embodiment of the invention in which the input signal is applied to the control grid of a first amplifier stage $V_5$ comprising a resistive load R. The delay line shown as an artificial line of surge impedance R is connected in parallel with load resistor R. The end of the line is opened (that is the line is terminated on condenser of the last cell) so that the signal will be reflected at the end of the line. Therefore, the delay introduced corresponds to the duration of the propagation of the signal in both directions along the line. This delay is equal to 0.5 $\mu$s. The line comprises for instance 20 cells identical with the one just described and therefore requires a volume half of the volume occupied by the delay line of the first stage of the embodiment shown of Figure 4. The output signal from $V_5$ is applied to the control grid of amplifier $V_6$ which feeds the second stage and so on. Coupling is performed by condenser 15 of high capacity with respect to the condensers of the artificial line. It is easy to show that the input impedance of the delay line associated to stage $V_5$ is given by $$Ze=\frac{-jR}{tgwa/2}$$

where R is the characteristic impedance of the line. The load impedance of tube $V_5$ comprises the parallel network made of a resistor R and the delay line. It is easy to calculate the modulus of the load impedance Z and the exponent respectively $$Z=R\cos a/2$$

$$\varphi=wa/2$$

The embodiment shown on Figure 6 requires the use of a greater number of tubes but allows amplification between two successive stages of the filter, together with automatic compensation of the losses in the delay lines. In this embodiment, coupling between stages is provided by means of cathode follower stages which provides a stable operation of the filter relatively to variations of the internal resistance of the coupling stages either due to ageing or to the tube manufacturing. Input signal is applied to the control grid of amplifier stage $V_5$, the load impedance of which comprises resistor R connected in parallel with the delay line of characteristic resistance R, closed on an adapted resistor. The delay introduced by the line is 0.5 $\mu$s. The signal across load resistor R is applied to the control grid of a first cathode follower stage $V_{10}$. The output signal delayed by the line is applied to the control grid of a second cathode follower stage $V_{11}$. The output circuits of $V_{11}$ and $V_{10}$ are connected in series by means of balancing resistors $R_1$ and $R_2$. A potentiometer P is used to pick-up the correct fraction of the output signal which is the sum of output signals from $V_{10}$ and $V_{11}$. The use of two resistors $R_1$ and $R_2$ of different values and the control of the gain of stages $V_{10}$ and $V_{11}$ enables to compensate, in each stage, the losses occurring in the delay line. The use of tubes $V_{10}$ and $V_{11}$ provides a better adaptation of the delay line and prevents multiple reflections of the pulses at the end of the line.

The embodiment shown on Figure 5 provides an economy on the required number of tubes and may be advantageously used when the delays $a$, $a/2$, etc., are sufficiently small so that the losses in the delay lines are negligible. The embodiment shown on Figure 6 is preferred when this condition is not fulfilled.

The realization of the delay line of the different stages depends on the frequency of operation. At ultra high frequency these lines should comprise either a certain length of transmission line or some kind of cavity; at microwave frequencies the delay is provided by a length of wave guide.

When the incoming signal is constituted by video signals, that is rectangular pulses without carrier wave, the filter according to the invention may be used and will operate in the same way. The delay line should be designed to operate at video frequencies and the pass-band filter 4 is replaced by a low-pass output filter.

As was said above, the use of the filter according to the invention is by no way limitated to pulse reception. For instance, if very short pulses are sent in the filter according to the invention, the output signal from the first stage (see Figure 2) will comprise two short pulses separated by a time interval equal to the delay $a$ introduced by the first stage. This is true if $a$ is very large with respect to the pulse duration or more precisely if $$\frac{a}{2^n}$$

which is the shortest delay introduced by any of the stages constituting the filter, is very small with respect to the pulse duration of the input signal. The output from the second stage will be a set of four short pulses occurring at time intervals of $$\frac{a}{2}$$

and so on from stage to stage. After the $n$th cell, the output signal is a set of $2^n$ pulses which are regularly occuring at time intervals $$\frac{2^n}{a}$$

and which occupied a time duration equal to $$2a\left(1-\frac{1}{2^n}\right)$$

The envelope of this set of pulses is a pulse of the same duration. This pulse is composed of a finite series of sinusoidal waves, the frequency of which are successive harmonics and which are set by the delay introduced by the successive stages of the filter. The phasing of these sinusoidal waves only is determinated by the leading edge of the input signal.

What I claim is:

1. A filter network of transfer characteristic $$G(w)=\frac{A \sin a(w-w_0)}{a(w-w_0)}$$

where A and $a$ are parameters independent from the frequency $$f=\frac{w}{2\pi}$$

$w_0$ is a constant parameter which may take any value such as $$w_0=\frac{K2^n}{a}$$

with $n$ being an integer $\geqslant 0$, said filter network comprising a plurality of elementary networks connected in cascade, each elementary network comprising a direct transmission channel and a delayed transmission channel connected in parallel between an input terminal and an output terminal, transmission delaying means included in the transmission delay channels of successive elementary networks to introduce in successive elementary networks decreasing amounts of delay according to a geometric series of first term ($a$) and a decrement of ½.

2. A filter network according to claim 1 and including a band-pass filter connected in said cascade and having a middle frequency $f_0$ related to the maximum delay ($a$) in accordance with $$2\pi f_0=\frac{K2^n}{(a)}$$

where $n$ is an integer $>0$.

3. A filter network according to claim 1 and including attenuating means in the direct transmission channels of said elementary networks.

4. A filter network according to claim 1 and including amplifying means inserted between successive elementary networks.

5. A filter network according to claim 2 wherein said band-pass filter comprises elementary filters embodied in said elementary networks.

6. A filter network according to claim 2 in which said band-pass filter is included at least in part in an input signal source feeding said filter network.

7. A filter network according to claim 1 in which each elementary network includes balancing means for connecting the two channels to the output terminal.

8. A filter network of transfer characteristic $$G(w)=\frac{A \sin aw}{aw}$$

in which A and $a$ are parameters independent from the frequency $$f=\frac{w}{2\pi}$$

said filter network comprising a plurality of elementary networks connected in cascade, each elementary network comprising a direct transmission channel and a delayed transmission channel connected in parallel to an input terminal and an additive stage connecting said two channels to a common output terminal, an output terminal, transmission delaying means included in the transmission delay channels of successive elementary networks to introduce in successive elementary networks decreasing amounts of delay according to a geometric series of first term ($s$) and a decrement of ½.

9. A filter network according to claim 8 and including a low-pass filter connected in said cascade.

10. A filter network according to claim 8 and including attenuating means in direct transmission channels of said elementary networks.

11. A filter network according to claim 8 in which said low-pass filter comprises elementary filters embodied in said elementary networks.

References Cited in the file of this patent

UNITED STATES PATENTS

| | | |
|---|---|---|
| 1,926,097 | Hansell | Sept. 12, 1933 |
| 2,024,900 | Wiener et al. | Dec. 17, 1935 |
| 2,124,599 | Wiener et al. | July 26, 1938 |
| 2,629,841 | Peterson | Feb. 24, 1953 |

UNITED STATES PATENT OFFICE

Certificate of Correction

Patent No. 2,854,641 September 30, 1958

Pierre Daguier

It is hereby certified that error appears in the above numbered patent requiring correction and that the said Letters Patent should read as corrected below.

In the grant, line 1, name of inventor, for "Pierre Dagnier" read *Pierre Daguier*; in the printed specification, column 4, line 18, for that portion of Equation (9) reading "$S_2=$" read $S_1=$; column 7, lines 18 and 19, for the mathematical expression $$\frac{2^n}{a} \quad \text{read} \quad \frac{a}{2^n}$$

Signed and sealed this 24th day of February 1959.

[SEAL]

Attest:

KARL H. AXLINE,
*Attesting Officer.*

ROBERT C. WATSON,
*Commissioner of Patents.*